(12) United States Patent
Kaupert (10) Patent No.: US 9,102,311 B2
(45) Date of Patent: Aug. 11, 2015

(54) MULTI-CIRCUIT PROTECTION VALVE FOR A COMPRESSED-AIR SUPPLY DEVICE OF A VEHICLE, AND METHOD FOR OPERATING A MULTI-CIRCUIT PROTECTION VALVE

(71) Applicant: KNORR-BREMSE Systeme fuer Nutzfahrzeuge GmbH, Munich (DE)

(72) Inventor: Oliver Kaupert, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 139 days.

(21) Appl. No.: 13/970,313

(22) Filed: Aug. 19, 2013

(65) Prior Publication Data

US 2014/0054956 A1 Feb. 27, 2014

Related U.S. Application Data (63) Continuation of application No. PCT/EP2012/052571, filed on Feb. 15, 2012.

(30) Foreign Application Priority Data

Feb. 17, 2011 (DE) .......... 10 2011 011 395

(51) Int. Cl.
| | | |
|---|---|---|
| B60T 17/02 | (2006.01) | |
| B60T 11/32 | (2006.01) | |
| B60T 17/04 | (2006.01) | |
| B60T 17/18 | (2006.01) | |
| B60T 17/22 | (2006.01) | |

(52) U.S. Cl.
CPC ............... *B60T 11/326* (2013.01); *B60T 17/04* (2013.01); *B60T 17/18* (2013.01); *B60T 17/221* (2013.01)

(58) Field of Classification Search
USPC ............. 303/28, 29, 37, 44, 81, 82, 123, 127; 137/1, 14, 596.17
See application file for complete search history.

(56) References Cited

U.S. PATENT DOCUMENTS

| 4,018,485 A | 4/1977 | Fannin | |
|---|---|---|---|
| 2010/0071779 A1* | 3/2010 | Bord CS | ............ 137/15.01 |

(Continued)

FOREIGN PATENT DOCUMENTS

| CN | 201501395 U | 6/2010 |
|---|---|---|
| DE | 199 54 584 A1 | 5/2001 |

(Continued)

OTHER PUBLICATIONS

German-language Office Action dated Sep. 22, 2011 (Five (5) pages).

(Continued)

*Primary Examiner* — Christopher Schwartz
(74) *Attorney, Agent, or Firm* — Crowell & Moring LLP (57) ABSTRACT

A multi-circuit protection valve is provided for a vehicle compressed-air supply device. A first port for a service brake includes two mutually separate service brake circuit ports for a first service brake circuit and a second service brake circuit. The two service brake circuit ports are protected by first and second service brake circuit overflow valves, respectively. A second port for a parking brake, is protected by an overflow valve, wherein one of the two service brake circuits can be filled preferentially. The overflow valve has two active surfaces which can be acted on with a valve inlet pressure and a valve outlet pressure, respectively. The overflow valve has a third active surface, which is acted on with the service brake pressure from the non-preferentially filled service brake circuit. Forces generated by the three active surfaces counteract a closing force in order to open or hold open the overflow valve.

15 Claims, 6 Drawing Sheets

(56) References Cited

U.S. PATENT DOCUMENTS

| | | | |
|---|---|---|---|
| 2011/0187181 A1* | 8/2011 | Kaupert | 303/20 |
| 2011/0259189 A1* | 10/2011 | Diekmeyer et al. | 95/10 |
| 2012/0073669 A1* | 3/2012 | Diekmeyer | 137/1 |
| 2014/0060653 A1* | 3/2014 | Kaupert | 137/1 |

FOREIGN PATENT DOCUMENTS

| | | |
|---|---|---|
| DE | 103 51 095 A1 | 6/2005 |
| DE | 10 2004 021 242 A1 | 11/2005 |
| DE | 10 2007 032 389 A1 | 1/2009 |
| DE | 10 2008 033 696 A1 | 3/2010 |
| GB | 2 310 017 A | 8/1997 |

OTHER PUBLICATIONS

International Search Report dated Jul. 25, 2012 with English translation (Four (4) pages).
English Translation of International Preliminary Report on Patentability (PCT/IB/373) and Written Opinion (PCT/ISA/237) dated Mar. 18, 2014 (seven (7) pages).
Chinese Office Action dated Feb. 25, 2015 (Five (5) pages).

* cited by examiner

MULTI-CIRCUIT PROTECTION VALVE FOR A COMPRESSED-AIR SUPPLY DEVICE OF A VEHICLE, AND METHOD FOR OPERATING A MULTI-CIRCUIT PROTECTION VALVE

BACKGROUND AND SUMMARY OF THE INVENTION

The invention concerns a multi-circuit protection valve for a compressed-air supply device of a vehicle, in particular a truck, with a first port for a service brake, wherein the first port has two separate service brake circuit ports for a first service brake circuit and a second service brake circuit, and wherein the first service brake connection is secured by a first service brake circuit overflow valve and the second service brake circuit port is secured by a second service brake circuit overflow valve, and with a second port for a parking brake which is secured by an overflow valve, wherein the first service brake circuit or the second service brake circuit can be filled as priority, and wherein the overflow valve has a first active face which can be pressurized with a valve input pressure and a second active face which can be pressurized with a valve output pressure.

The invention furthermore concerns a method for operating a multi-circuit protection valve for a compressed-air supply device of a vehicle, in particular a truck, with a first port for a service brake, wherein the first port comprises two separate service brake circuit ports for a first service brake circuit and a second service brake circuit, and wherein the first service brake circuit port is secured by a first service brake circuit overflow valve and the second service brake circuit port is secured by a second service brake circuit overflow valve, and with a second port for a parking brake which is secured by an overflow valve, wherein the first service brake circuit or the second service brake circuit is filled as priority.

Modern vehicles, in particular trucks and heavy goods vehicles, often have a pneumatically driven brake system which is composed of a service brake and a parking brake. Normally the service brake is opened in pressureless state, while the parking brake is closed in pressureless state in order to allow secure parking of the vehicle. Consequently, to close the service brake and open the parking brake, loss-free service pressures are required in the respective function circuits. In order to be able to exert a braking force on the vehicle at any time, it is prescribed that the service brake must be filled to a sufficient pressure level for braking the vehicle before the parking brake. This ensures that the parking brake cannot be released until sufficient braking effect can be provided via the service brake.

To fulfill this legal requirement, various solutions are known in the prior art, wherein the fundamental idea in all cases is based on the supply to the parking brake circuit, i.e. the filling of this circuit, being delayed until sufficient pressure and hence braking force is present or can be provided in the service brake.

It is known, for example, to provide a parallel flow to overflow valves, which separate two mutually independent service brake circuits of the service brake, from a central region of a multi-circuit protection valve. On the output side, i.e. in the direction towards the respective service brake circuit, a branch with a non-return valve branches off downstream of the respective overflow valve. The two branches open into a common pressure line, from which in turn the parking brake circuit is supplied via an overflow valve. In this way it is ensured that at least one of the two service brake circuits has an operating pressure at the level of the opening pressure of the overflow valve securing the parking brake circuit, before this opens and the parking brake circuit is supplied with compressed air.

As a further solution it is known to fill the service brake circuit and parking brake circuit from a central region in parallel to each other, wherein overflow valves are arranged in the respective ports and can be filled in parallel with each other. The filling sequence can be achieved via different opening pressures of the overflow valves, wherein sufficiently great safety intervals must be observed between the different opening pressures in the service brake circuit and the parking brake circuit.

It is also known to fit a 2/2-way blocking valve which can be controlled with the service pressures from the service brake circuits in order to prevent the supply to, i.e. the filling of, the parking brake circuit. If, to open this blocking valve, a sufficient operating pressure is necessary in one or more service brake circuits, the legal requirement with regard to the filling sequence is also fulfilled.

An alternative solution, which can be used in particular if the air preparation unit has an electronic control system, is to monitor the pressure in the service brake circuits. The supply to the parking brake circuit is blocked as long as the measured pressures are not sufficient to generate the necessary braking force. To this end, suitably a 3/2-way valve, which can be designed as a solenoid valve, can conduct pressure into a spring chamber of the overflow valve securing the parking brake circuit, so that the maximum available pressure in the central region, from which the parking brake circuit is supplied, is insufficient to open the overflow valve. Only when sufficient pressure is detected in the service brake circuits is the spring chamber purged via the solenoid valve, so that the pressure in the central region is sufficient to open the overflow valve. From this moment, the parking brake circuit is supplied with compressed air.

The object of the present invention is to propose an alternative, purely pneumatic solution.

The invention is based on the prior art in that the overflow valve has a third active face which can be pressurized with a service brake pressure from the service brake circuit of the service brake which was not filled as priority, and that the forces generated via the three active faces counter a closing force to open or hold open the overflow valve. In this way the opening of the overflow valve can be made dependent on an adequate service brake pressure in both service brake circuits, since the lower service brake pressure via the third active face makes a direct contribution to the opening of the overflow valve, countering the closing force. Thus the legal requirement for the filling sequence, i.e. service brake circuit before parking brake circuit, can be fulfilled, wherein in particular both service brake circuits are filled before the parking brake circuit. Priority here can mean priority over the other service brake circuit or priority over all other consumer circuits, i.e. both over the other service brake circuit and over the parking brake circuit.

It can furthermore be provided that the first service brake circuit overflow valve has a lower opening pressure than the second service brake circuit overflow valve. In particular in this way, the first service brake circuit can always be filled first before the second service brake circuit can be filled, which again can then allow the opening of the overflow valve via the force generated on the third active face. In this way it can be ensured that the filling of both service brake circuits is completed before the parking brake circuit is filled.

It can be provided that a non-return valve is arranged parallel to the first service brake circuit overflow valve and allows a flow in the direction of the first service brake circuit port. In this way, independently of the opening pressure of the first service brake circuit overflow valve, it can be ensured that the first service brake circuit is filled as priority so that that filling of both service brake circuits is also completed before the necessary third force to open the overflow valve is generated via the service brake pressure from the second service brake circuit.

Usefully, it can be provided that the multi-circuit protection valve comprises a control valve with a first control valve inlet port, a second control valve inlet port and a control valve outlet port, wherein the two control valve inlet ports are each pressurized with one of the two service brake pressures from the two service brake circuit ports, and the control valve output port of the control valve pressurizes the third active face of the overflow valve. The control valve can, for example, be designed as a "select low" valve which outputs at the control valve output port the lower pressure present at the two control valve input ports. Thus the lower service brake pressure from the first service brake circuit or the second service brake circuit can always be used to pressurize the third active face of the overflow valve. This allows the filling of both service brake circuits before the filling of the parking brake circuit, wherein the filling sequence of the two service brake circuits can be variable, i.e. in particular also random.

Advantageously it can be proposed that the parking brake circuit is post-supplied from the service brake circuits. The post-supply can, for example, take place from the first service brake circuit, so that the valve input pressure of the overflow valve is provided from the first service brake circuit. Thus filling of at least one of the service brake circuits as priority over the parking brake circuit can be ensured.

In particular it can be proposed that the multi-circuit protection valve comprises a supply valve with a first supply valve input port, a second supply valve input port and a supply valve output port, wherein the two supply valve input ports of the supply valve are each pressurized with one of the two service brake pressures from the two service brake circuit ports, and the supply valve output port of the supply valve provides the valve input pressure of the overflow valve. The supply valve can, for example, be designed as a "select high" valve so that only one service brake circuit need be functioning in order to allow the supply of the parking brake circuit.

In can furthermore be provided that the parking brake circuit is supplied with pressure in parallel with the service brake circuits. The supply of the parking brake circuit can thus be ensured independently of a defect in the service brake circuits.

In particular it can be provided that the forces generated via the three active faces are smaller individually than the closing force. Thus the function of the overflow valve for securing the parking brake circuit can be maintained, since on an absence of the valve input pressure at the first active face and of the service brake pressure at the third active face, the force present at the second active face is not sufficient to hold the overflow valve open against the closing force. Furthermore in this way on first filling, i.e. with a pressureless parking brake circuit, it is ensured that to fill the parking brake circuit, as well as a sufficient valve input pressure at the first active face, a sufficient service brake pressure is necessary at the second active face.

It can be provided that the forces generated via the three active faces are greater in pairs than the closing force. This allows the overflow valve to be held open if a pressure drop occurs in one of the two service brake circuits.

Usefully, such a multi-circuit protection valve can be provided as part of a compressed-air supply device of a vehicle, in particular a truck.

The generic method is refined in that a first active face of the overflow valve is pressurized with a valve input pressure, a second active face of the overflow valve is pressurized with a valve output pressure, a third active face of the overflow valve is pressurized with a service brake pressure from the service brake circuit of the service brake which was not filled as priority, and forces generated via the three active faces counter a closing force to open or hold open the overflow valve.

In this way the benefits and features of the invention can also be implemented in a method.

BRIEF DESCRIPTION OF THE DRAWINGS

The invention is now explained below with reference to the enclosed drawings and preferred embodiments. These show.

DETAILED DESCRIPTION OF THE DRAWINGS

In the drawings which follow, the same reference numerals designate the same or similar parts.

Figure 1:
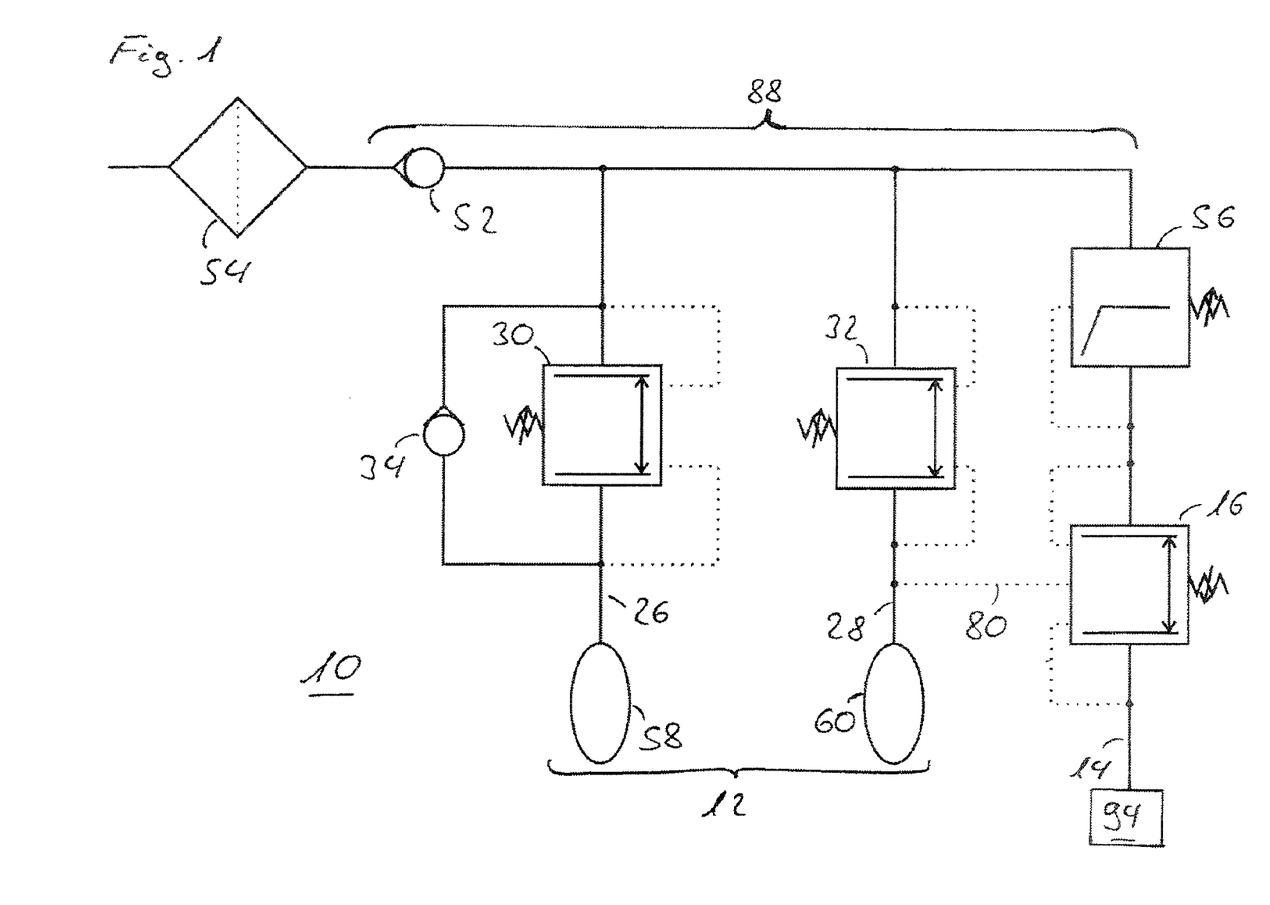
FIG. 1 is a schematic diagram of a first embodiment of a multi-circuit protection valve.

FIG. 1 shows a first embodiment of a multi-circuit protection valve. The multi-circuit protection valve 10 shown in FIG. 1 has a central line region 88 which is secured against pressure loss on the input side by a central non-return valve 52. Also, the coupling of the central non-return valve 52 with an air dryer 54 of a compressed-air preparation system, which is symbolized by the drying cartridge normally present, is shown on the input side as an example. The central line region 88 branches downstream of the central non-return valve 52 to provide a first port 12 and a second port 14 for compressed-air consumers. Further branches from the central line region 88, which are not shown in FIG. 1, can be provided as required in order to provide further ports, for example, for air suspension, a vehicle trailer, pneumatic transmission control or other ancillary consumers. The first port 12 comprises a first service brake circuit port 26 and a second service brake circuit port 28. The first service brake circuit port 26 is secured by a first service brake circuit overflow valve 30 and the second service brake circuit port 28 is secured by a second service brake circuit overflow valve 32. A first service brake circuit 58 which is connected to the first service brake circuit port 26, and a second service brake circuit 60 which is connected to the second service brake circuit port 28, are indicated merely diagrammatically as pressure vessels. A non-return valve 34 is arranged parallel to the first service brake circuit overflow valve 30 as a bypass, in order to allow filling of the first service brake circuit 58 while bypassing the first service brake circuit overflow valve 30. The bypass with the non-return valve 34 is optional and can be omitted. The non-return valve 34 in particular ensures a preferential filling of the first service brake circuit 58 before the second service brake circuit 60. The second port 14 is secured against pressure loss by an overflow valve 16 against the central line region 88. Furthermore, a pressure limiter 56 is provided in the branch leading to the second port 14, in order to provide at the second port 14 a service pressure which is reduced in relation to the service pressure provided for the first service brake circuit 58 and the second service brake circuit 60. The pressure limiter 56 limits the supply pressure present at the overflow valve 16 to around 8.5 bar, compared with around 12.5 bar which can be provided as the supply pressure for the service brake. In particular, a parking brake circuit 94 can be connected at the second port 14. The overflow valve 16, as well as the usual control facility via an input pressure and an output pressure, also has a port for a control line 80 via which a service pressure for controlling the overflow valve 16 can be provided from the second service brake circuit port 28. The precise function of this principle is described in connection with FIGS. 5 and 6.

During the first filling, i.e. with the system fully pressureless, compressed air is conducted via the central non-return valve 52 to the central line region 88. From there, the service brake circuit overflow valves 30, 32 provided to secure the first service brake circuit port 26, the second service brake circuit port 28 and the parking brake circuit port 94, and the overflow valve 16 are supplied in parallel. By the construction, the first service brake circuit overflow valve 30 can have a lower opening pressure than the second service brake circuit overflow valve 32 and open first. In this case, the first service brake circuit overflow valve 30 opens before the second service brake circuit overflow valve 32, and the first service brake circuit 58 is filled preferentially, i.e. as priority. The non-return valve 34 can then be omitted. However, it can also be provided that the first service brake circuit overflow valve 30 has the same opening pressure as the second service brake circuit overflow valve 32, wherein then it depends on chance whether the first service brake circuit overflow valve 30 or the second service brake overflow valve 32 opens first. The non-return valve 34 arranged optionally as a bypass for the first service brake circuit overflow valve 30 can solve this problem since, by bypassing the first service brake circuit overflow valve 30, filling of the first service brake circuit 58 can begin via the non-return valve 34 even at a pressure level which is lower than the opening pressure of the first service brake circuit overflow valve 30. If the pressure level in the first service brake circuit 58 exceeds the opening pressure of the second service brake circuit overflow valve 32, the second service brake circuit overflow valve 32 also opens, since the pressure level in the first service brake circuit 58 rises together with the pressure level in the central line region 88. At this moment, the overflow valve 16 is still closed, since the input pressure present there is insufficient to open the overflow valve 16, which requires a higher opening pressure than the two service brake circuit overflow valves 30, 32. The start of filling of the second service brake circuit 60, however, transmits a control pressure to the overflow valve 16 via the control line 80, wherein the two pressures—the input pressure and the control pressure—together finally are sufficient to open the overflow valve 16 so that the parking brake circuit 94 can be filled. It can here be provided that the additional pressure level of the control pressure in the control line 80, which is necessary to open the overflow valve 16, is sufficient to close the second service brake circuit. In this way it can be ensured that both service brake circuits 58, 60 are filled before the parking brake circuit 94.

Figure 2:
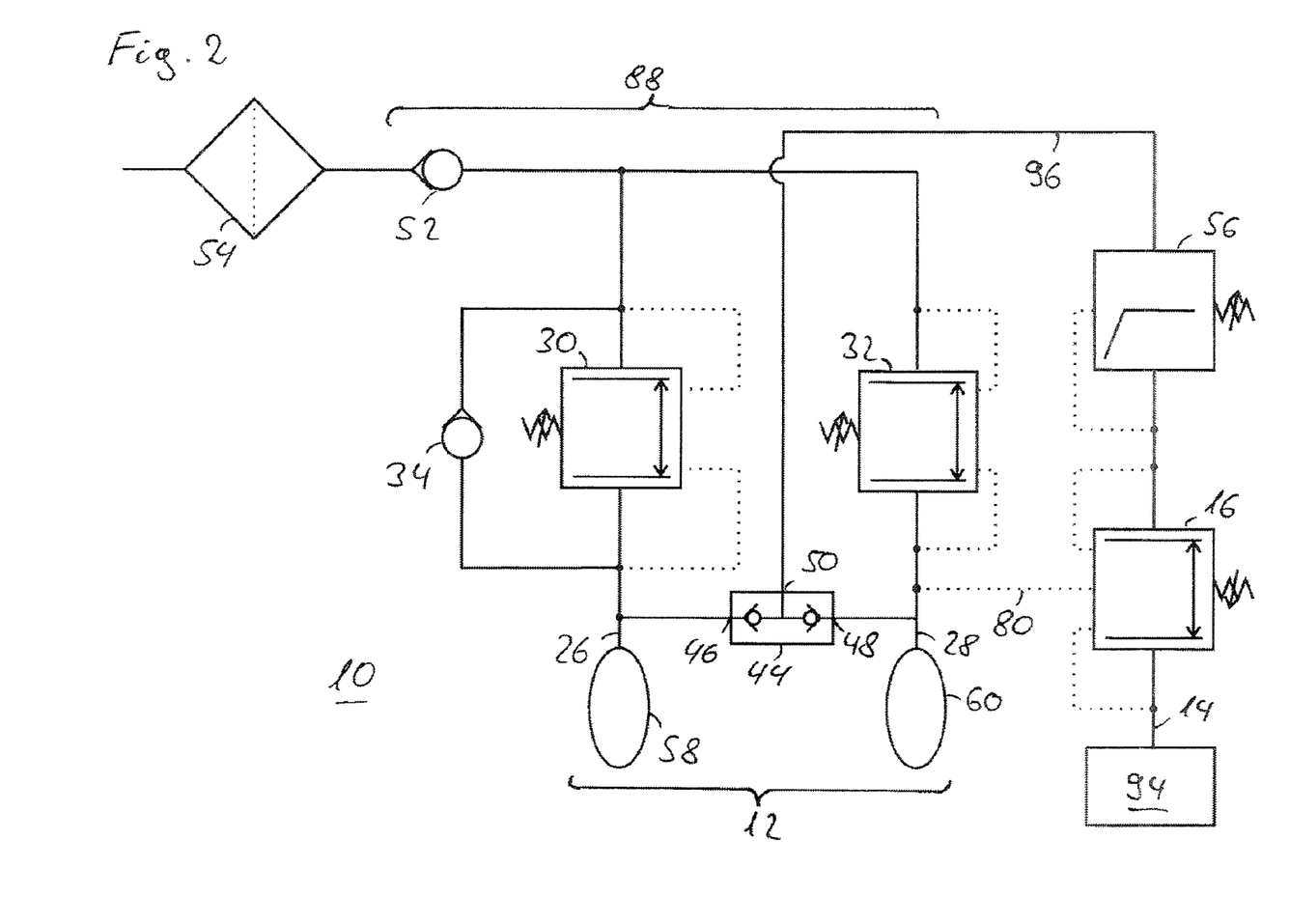
FIG. 2 is a schematic diagram of a second embodiment of a multi-circuit protection valve.

FIG. 2 shows a second embodiment of a multi-circuit protection valve. In contrast to the embodiment known from FIG. 1, in the embodiment of the multi-circuit protection valve 10 shown in FIG. 2, the parking brake circuit 94 is post-supplied via a supply line 96 from both service brake circuit ports 26, 28. To this end a supply valve 44, which for example can be designed as a "select high" valve, can be coupled to the supply line 96 at a supply valve output port 50. Furthermore, a first supply valve input port 46 is coupled to the first service brake circuit port 26, and a second supply valve input port 48 is coupled to the second service brake circuit port 28. The supply valve 44 can be constructed for example, as shown in FIG. 2, from two simple non-return valves so that the first service brake circuit 58 and the second service brake circuit 60 are secured against each other, and the higher of the two pressures from the two service brake circuits 58, 60 is output at the supply valve output 50.

In a similar fashion to the first embodiment in FIG. 1, on first filling of the system it can be ensured that both service brake circuits 58, 60 are filled as priority before the parking brake circuit 94 via the optional non-return valve 34 or via a lower opening pressure of the first service brake circuit overflow valve 30 than the second service brake circuit overflow valve 32.

If all circuits are intact and a high air extraction by the service brake has occurred due to multiple braking, which causes a pressure fall in the system, the overflow valve 16 can be held open since forces can still be generated at the supply input of the overflow valve 16 and the via the control line 80, which forces adequately counter the closing force of this overflow valve 16. The function principle therefore corresponds substantially to that of the embodiment from FIG. 1, wherein it is ensured in particular that the two service brake circuits 58, 60 are filled as priority over the parking brake circuit 94.

Figure 3:
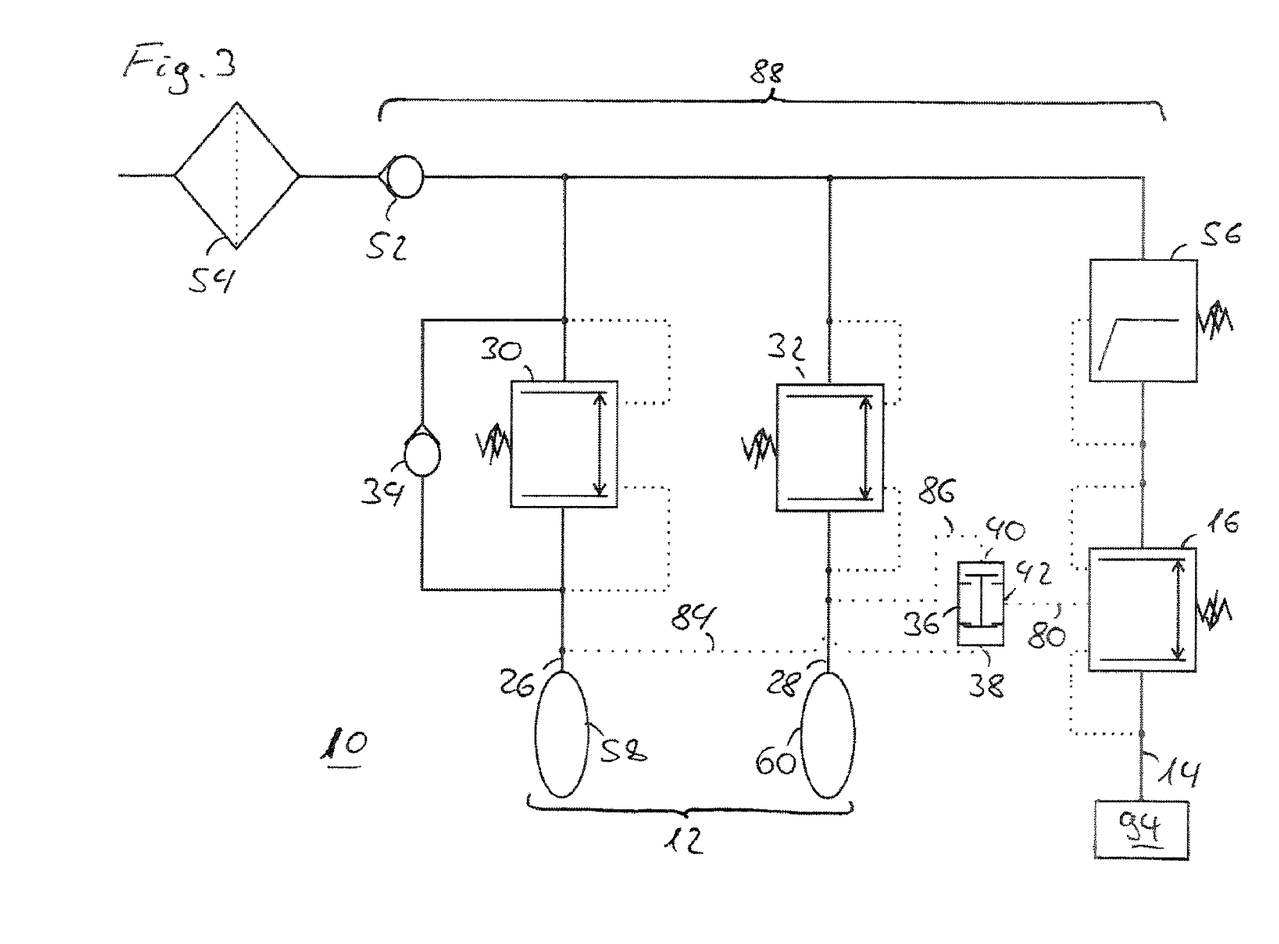
FIG. 3 is a schematic diagram of a third embodiment of a multi-circuit protection valve.

FIG. 3 shows a third embodiment of a multi-circuit protection valve. The multi-circuit protection valve 10 shown in FIG. 3 differs from the multi-circuit protection valve known from FIG. 1 in particular in the manner in which the control pressure is provided to the overflow valve 16 via the control line 80. According to the embodiment described in FIG. 3, a control valve 36 is proposed which has a first control valve input port 38 and a second control valve input port 40 and a control valve output port 42. The first control valve input port 38 is coupled to the first service brake service circuit port 26 via a first control pressure line 84, while the second control valve input port 40 is coupled to the second service brake circuit port 28 via a second control pressure line 86. The control valve output port 42 is, in turn, connected to the overflow valve 16 via the control line 80. The control valve 36 shown can be designed as a "select low" valve which always outputs at its control valve output port 42 the lower of the two pressures present at the control valve input ports 38, 40. In this way it can be ensured that irrespective of the opening pressures of the first service brake circuit overflow valve 30 and the second service brake circuit overflow valve 32, or the presence of the non-return valve 34 as a bypass for the first service brake circuit overflow valve 30, the filling of the first service brake circuit 58 and the second service brake circuit 60 take place as priority over the parking brake circuit 94.

The function of the multi-circuit protection valve shown in FIG. 3, in particular the function principle of the overflow valve 16, corresponds to that of the multi-circuit protection valve known from the two previous figures.

Figure 4:
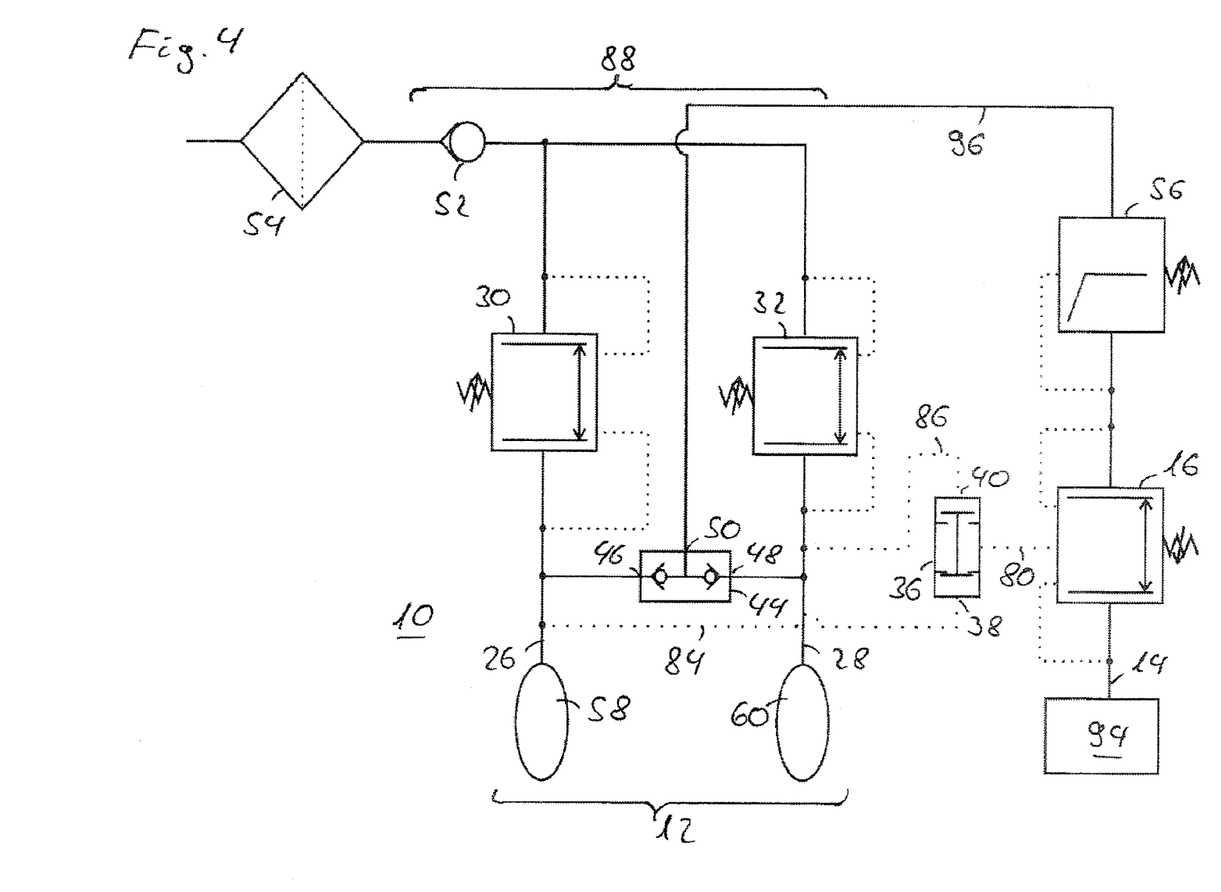
FIG. 4 is a schematic diagram of a fourth embodiment of a multi-circuit protection valve.

FIG. 4 shows a fourth embodiment of a multi-circuit protection valve. The multi-circuit protection valve 10 shown in FIG. 4 differs from the previous embodiments essentially in that the control valve 36 is also present in addition to the supply valve 44, via which the parking brake circuit 94 can be post-supplied from the first service brake circuit 58 or from the second service brake circuit 60. The functions of the supply valve 44 and control valve 36 correspond to those from the previous embodiments. The supply valve 44 therefore again has a first supply valve input port 46 which is coupled to the first service brake circuit port 26, and a second supply valve input port 48 which is coupled to the second service brake circuit port 28. Via the supply valve output port 50 of the supply valve 44, the parking brake circuit 94 can be post-supplied via the overflow valve 16 and the pressure limiter 56, again via the supply line 96. The supply valve 44, as shown in FIG. 4, can be designed as a "select high" valve which outputs at the supply valve output port 50 the higher of the two pressures present at the two supply valve input ports 46, 48 from the first service brake circuit 58 and the second brake circuit 60. In this way, irrespective of the opening pressures of the first service brake circuit overflow valve 30 and second service brake circuit overflow valve 32, a priority filling of both service brake circuits 58, 60 over the parking brake circuit 94 can be ensured, since the pressure present in the control line 80 from one of the two service brake circuits 58, 60, like the valve input pressure present from the overflow valve 16 alone, is insufficient to open the overflow valve 16 against the closing force when the parking brake circuit 94 is pressureless.

The non-return valve 34 not shown in FIG. 4, which is arranged parallel to the first service brake circuit overflow valve 30 and serves as a bypass for filling the first service brake circuit 58, bypassing the first service brake circuit overflow valve 30, can be omitted. Furthermore, because of the combination of the supply valve 44 and control valve 36, the two service brake circuit overflow valves 30, 32 can also have identical opening pressures without jeopardizing the preferential filling of the two service brake circuits 58, 60 over the parking brake circuit 94. The interplay of the control valve 36 and the supply valve 44 regularly provides a service pressure, namely via the control line 80, which is taken from the other of the two service brake circuits 58, 60 against the input pressure at the overflow valve 16.

Figure 5:
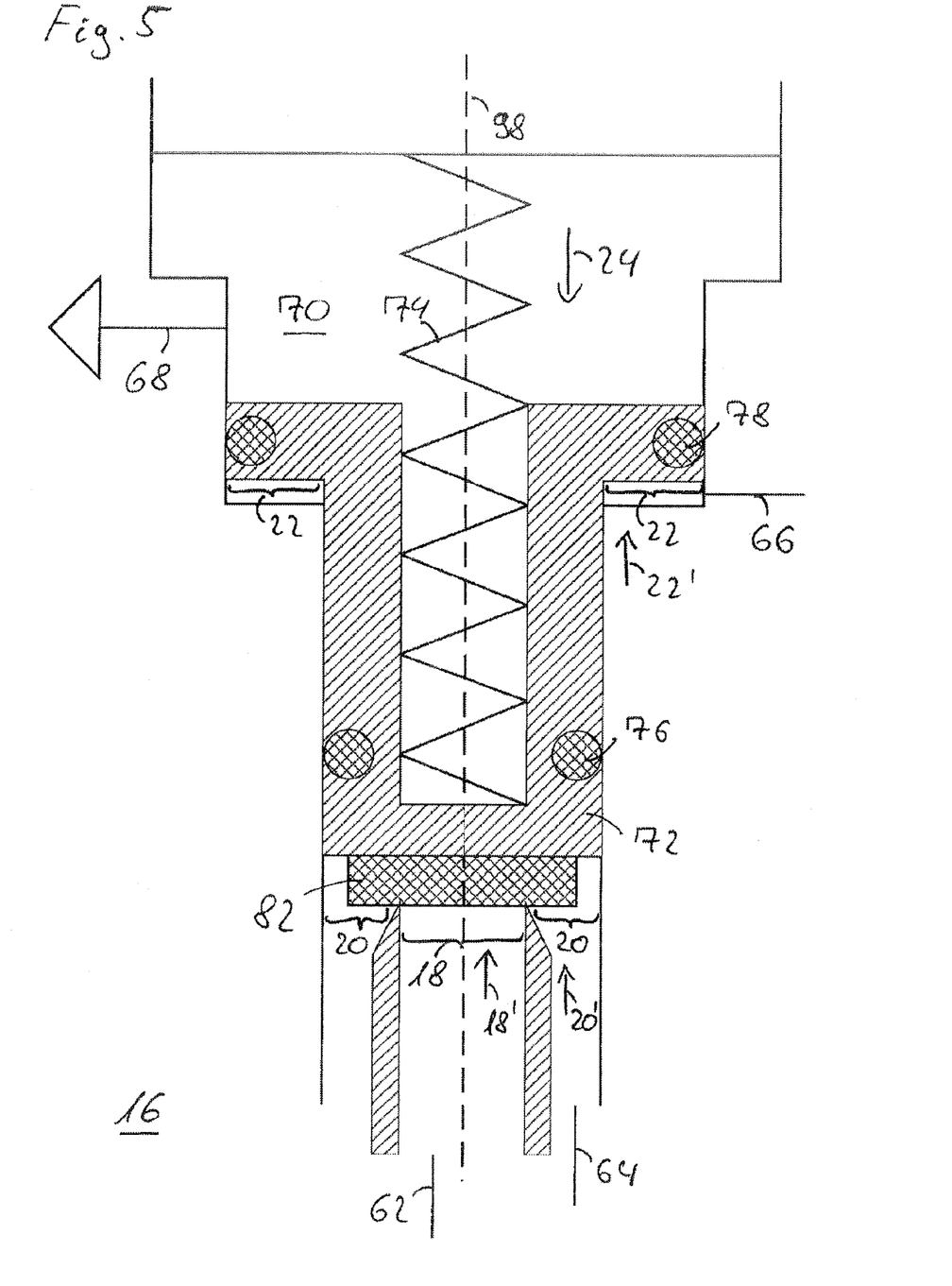
FIG. 5 is a view of an overflow valve in its closed switch position.

The function of the overflow valve 16 is indicated in outline below. FIG. 5 shows an overflow valve in its closed switch position. The overflow valve 16 is shown in cross section, wherein a rotationally symmetrical structure of the overflow valve 16 can be provided. The overflow valve 16 shown in FIG. 5 has a valve input port 62 and a valve output port 64, a valve control port 66 and a purge 68. In the closed switch position shown, the valve input port 62 ends at a valve seat 82 of a switch piston 72, which is arranged moveably inside a switch chamber 70. In this way a first active face 18 is defined which can be pressurized with a valve input pressure via the valve input port 62, in order to generate a first force 18' parallel to an axial movement direction 98 of the switch piston 72. The valve output connection 64 defines, in a similar manner, a second active face 20, via which—also similarly—a second force 20' can be generated parallel to the axial movement direction 98 via a valve output pressure. The valve control port 66 opens into a region between the switch piston 72 and a valve housing, not designated further, wherein this region is sealed by a seal 76 and a further seal 78. In this way a third active face 22 is defined, via which a third force 22' can be generated which also lies parallel to the axial movement direction 98 of the switch piston 72. In pressureless state of the overflow valve 16, the switch piston 72 can be pressed by an elastic element 74, which can for example be designed as a spring element, in the axial movement direction 98 against the valve seat 82. To this end, the elastic element 74 exerts on the switch piston 72 a closing force 24 lying parallel to the axial movement direction 98. On the side of the switch chamber 70 lying opposite the switch piston 72, the elastic element 74 can rest on a housing not designated further. The switch chamber 70 can be held pressureless via the purge 68 so that in addition to the closing force 24, no further forces occur which hold the overflow valve 16 in its closed position or transfer it into its closed position. The first force 18', the second force 20' and the third force 22' work together against the closing force 24 to transfer the overflow valve 16 into its open position.

Figure 6:
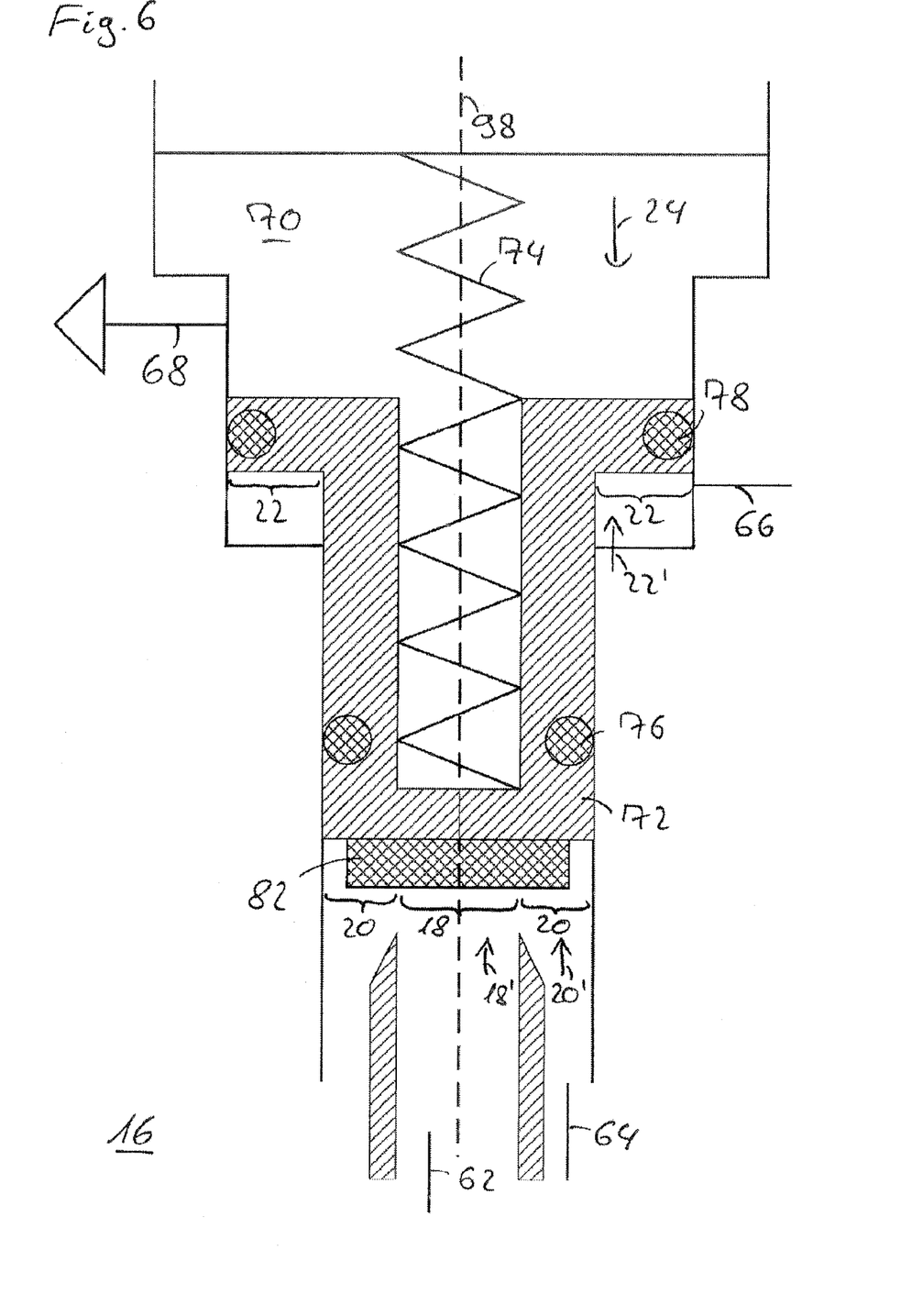
FIG. 6 is a view of an overflow valve in its open switch position.

FIG. 6 shows an overflow valve in its open switch position. The overflow valve shown in FIG. 6 corresponds to the overflow valve 16 known from FIG. 5 in its open switch position. The pressure forces present at the valve input port 62, the valve output port 64 and the valve control port 66, which generate the first force 18', the second force 20' and the third force 22', are together sufficient to lift the switch piston 72 from the valve seat 82 against the closing force 24 so that the valve input port 62 is connected to the valve output port 64.

The overflow valve 16 shown in FIGS. 5 and 6 can be used in the embodiments according to FIGS. 1 to 4 to secure the parking brake circuit 94, wherein then the valve control port 66 can be coupled to the control line 80.

The first active face 18, the second active face 20, the third active face 22 and the elastic element 74 can together be designed such that the forces 18', 20', 22' generated at the active faces 18, 20, 22, are smaller individually than the closing force 24 in normal mode, i.e. at the pressure level provided for operation without a defect. Furthermore, the active faces 18, 20, 22 can be dimensioned such that the forces 18', 20', 22' occurring are greater in pairs than the closing force 24 in normal operation. The three active forces 18', 20', 22' can therefore easily be adjusted via a change in diameter of the first active face 18, the outer and inner radius of the second active face 20, and the outer and inner radius of the third active face 22.

If the overflow valve shown in FIGS. 5 and 6 is arranged in a multi-circuit protection valve according to the embodiment shown in FIG. 1, an initially pressureless braking system with a service brake and a parking brake can be filled as follows. At first the overflow valve 16 is in the closed switch position shown in FIG. 5, wherein the valve input port 62, the valve output port 64 and the valve control port 66 are pressureless. As the pressure level rises in the central line region 88, the pressure level present at the valve input port 62 also rises, wherein the resulting first force 18' is not sufficient to open the overflow valve 16. As soon as one of the two service brake circuits 58, 60 is filled by an opening of one of the two service brake circuit overflow valves 30, 32 or by means of the optional bypass with the non-return valve 34, the pressure present at the valve input port 62 stagnates until the service brake circuit 58; 60 to be filled has reached the pressure level present in the central line region 88. Then, there is a further slow continuous rise in the pressure level present in the central line region 88, which is accompanied by an increase in the pressure level present at the valve input port 62. When the second service brake circuit overflow valve 32 opens, the second service brake circuit 60 is filled and, via the control line 80, the service brake circuit pressure present in the second service brake circuit 60 is conducted to the valve control port 66. In addition to the first force 18' therefore, a third force 22' is generated at the third active face 22 by the service brake circuit pressure present, which force together with the first force 18' counters the closing force 24. If the pressure in the second service brake circuit 60 is sufficient for example to close the second service brake circuit 60, the sum of the first force 18' and the third force 22' can also exceed the closing force 24 and the overflow valve 16 opens. At this moment, the filling of the parking brake circuit 94 via the valve output port 64 begins. The pressure level necessary for opening can, for example, be 8 bar in the one service brake circuit and at least 4 bar in the second service brake circuit, preferably 6.5 bar. It is clear that the pressure levels are adjustable and the precise figures and pressure intervals between the first and second service brake circuit are system-dependent, since they can be controlled by the filling rates. The three forces 18', 20', 22' generated at the three active faces 18, 20, 22 increase further until finally the proposed operating pressures are reached in all circuits connected to the multi-circuit protection valve 10. Since the overflow valve 16 is arranged downstream of a pressure limiter 56, the pressures present at the valve input port 62 and the valve output port 64 are lower than the service brake pressure present at the valve control port 66.

On a fault in one of the two service brake circuits, for example the second service brake circuit 60, the third force 22' generated at the third active face 22 disappears without replacement if this service brake circuit pressurizes the valve control port 66. The sum of the first force 18' generated at the first active face 18 and the second force 20' generated at the second active face 20 can, however, still be greater than the closing force 24, so that a pressure supply to the parking brake circuit 94 is still possible and the vehicle remains ready for service. Even on a defect in the other service brake circuit, the vehicle can remain serviceable, wherein in this case the third force 22' at the third active face 22 is maintained. With regard to the serviceability of the vehicle in the event of a defect, i.e. on failure of one of the two service brake circuits 58, 60, the embodiments of the multi-circuit protection valve 10 shown in FIGS. 1 to 4 behave similarly. Irrespective of embodiment, on a fault in one of the two service brake circuits 58, 60, the supply to the overflow valve 16 is ensured and the overflow valve can be held open. However, a first filling of the pressureless parking brake circuit 94 is not always possible in the case of a defect.

A defect in the parking brake circuit 94 with a strong pressure drop at the valve output port 64 ensures a fall in the first force 18' generated at the first active face 18 and the second force 20' generated at the second active face 20, so that in principle only the third force 22' generated at the third active face 22 counters the closing force of the overflow valve 16. Since the third force 22' generated at the third active face 22 alone is not sufficient to keep the overflow valve 16 open, this leads to closure of the overflow valve 16 without great pressure losses.

The features of the invention disclosed in the description above, the drawings and the claims, can be essential to the implementation of the invention both individually and in arbitrary combination.

LIST OF REFERENCE NUMERALS

10 Multi-circuit protection valve
12 First port
14 Second port
16 Overflow valve
18 First active face
18' First force
20 Second active face
20' Second force
22 Third active face
22' Third force
24 Closing force
26 First service brake circuit port
28 Second service brake circuit port
30 First service brake circuit overflow valve
32 Second service brake circuit overflow valve
34 Non-return valve
36 Control valve
38 First control valve input port
40 Second control valve input port
42 Control valve output port
44 Supply valve
46 First supply valve input port
48 Second supply valve input port
50 Supply valve output port
52 Central non-return valve
54 Air dryer
56 Pressure limiter
58 First service brake circuit
60 Second service brake circuit
62 Valve input port
64 Valve output port
66 Valve control port
68 Purge
70 Switch chamber
72 Switch piston
74 Elastic element
76 Seal
78 Further seal
80 Control line
82 Valve seat
84 First pressure control line
86 Second pressure control line
88 Central line region
94 Parking brake circuit
96 Supply line
98 Axial movement direction

The invention claimed is:

1. A multi-circuit protection valve for a compressed-air supply device of a vehicle, comprising:
   a first port for a service brake, wherein the first port has two separate service brake circuit ports for a first service brake circuit and a second service brake circuit, and wherein the first service brake circuit port is secured by a first service brake circuit overflow valve and the second service brake circuit port is secured by a second service brake circuit overflow valve, and
   a second port for a parking brake, which is secured by an overflow valve,
   wherein the first service brake circuit or the second service brake circuit is fillable on a priority basis,
   wherein the overflow valve has a first active face which is pressurizable with a valve input pressure, a second active face which is pressurizable with a valve output pressure, and a third active face which is pressurizable with a service brake pressure from the non-priority filled service brake circuit, and
   wherein forces generated via the three active faces counter a closing force to open or hold open the overflow valve.

2. The multi-circuit protection valve according to claim 1, further comprising:
   a non-return valve arranged parallel to the first service brake circuit overflow valve that allows flow in a direction of the first service brake circuit port.

3. The multi-circuit protection valve according to claim 2, further comprising:
   a control valve with a first control valve input port, a second control valve input port and a control valve output port, wherein
      the first and second control valve input ports are each pressurized with one of the two service brake pressures from the two service brake circuit ports, and the control valve output port of the control valve pressurizes the third active face of the overflow valve.

4. The multi-circuit protection valve according to claim 3, wherein the parking brake circuit is post-supplied from the service brake circuits.

5. The multi-circuit protection valve according to claim 1, wherein the first service brake circuit overflow valve has a lower opening pressure than the second service brake circuit overflow valve.

6. The multi-circuit protection valve according to claim 5, further comprising:

a non-return valve arranged parallel to the first service brake circuit overflow valve that allows flow in a direction of the first service brake circuit port.

7. The multi-circuit protection valve according to claim 1, wherein the parking brake circuit is post-supplied from the service brake circuits.

8. The multi-circuit protection valve according to claim 7, further comprising:

a supply valve with first supply valve input port, a second supply valve input port and a supply valve output port, wherein the first and second supply valve input ports of the supply valve are each pressurized with one of the two service brake pressures from the two service brake circuit ports, and the supply valve output port of the supply valve provides a valve input pressure of the overflow valve.

9. The multi-circuit protection valve according to claim 1, further comprising:

a control valve with a first control valve input port, a second control valve input port and a control valve output port, wherein the first and second control valve input ports are each pressurized with one of the two service brake pressures from the two service brake circuit ports, and the control valve output port of the control valve pressurizes the third active face of the overflow valve.

10. The multi-circuit protection valve according to claim 1, wherein the parking brake circuit is supplied with pressure in parallel to the service brake circuits.

11. The multi-circuit protection valve according to claim 1, wherein the forces generated via the three active faces are smaller individually than the closing force.

12. The multi-circuit protection valve according to claim 1, wherein the forces generated via the three active faces are greater in pairs than the closing force.

13. A compressed-air supply device for a vehicle, comprising:

a multi-circuit protection valve for the compressed-air supply device, the multi-circuit protection valve comprising:

a first port for a service brake, wherein the first port has two separate service brake circuit ports for a first service brake circuit and a second service brake circuit, and wherein the first service brake circuit port is secured by a first service brake circuit overflow valve and the second service brake circuit port is secured by a second service brake circuit overflow valve, and a second port for a parking brake, which is secured by an overflow valve, wherein the first service brake circuit or the second service brake circuit is Tillable on a priority basis, wherein the overflow valve has a first active face which is pressurizable with a valve input pressure, a second active face which is pressurizable with a valve output pressure, and a third active face which is pressurizable with a service brake pressure from the non-priority filled service brake circuit, and wherein forces generated via the three active faces counter a closing force to open or hold open the overflow valve.

14. The compressed-air supply device according to claim 13, wherein the vehicle is a heavy vehicle.

15. A method for operating a multi-circuit protection valve for a compressed-air supply device of a vehicle, the multi-circuit protection valve comprising a first port for a service brake, and a second port for a parking brake, wherein the first port has two separate service brake circuit ports for a first service brake circuit and a second service brake circuit, and wherein the first service brake circuit port is secured by a first service brake circuit overflow valve and the second service brake circuit port is secured by a second service brake circuit overflow valve, and wherein the second port for the parking brake is secured by an overflow valve, the first service brake circuit or the second service brake circuit being fillable on a priority basis, the method comprising the acts of:

pressurizing, with a valve input pressure, a first active face of the overflow valve by which the second port for the parking brake is secured;

pressurizing, with a valve output pressure, a second active face of the overflow valve;

pressurizing, with a service brake pressure from the service brake circuit of the service brake which was not filled on the priority basis, a third active face of the overflow valve; and countering a closing force that opens or holds open the overflow valve via the forces generated by the pressurizing of the first, second and third active faces.

\* \* \* \* \*